(12) United States Patent
Wang et al.

(10) Patent No.: US 11,468,689 B2
(45) Date of Patent: Oct. 11, 2022

(54) METHOD AND APPARATUS FOR DETECTING OBSTACLE, ELECTRONIC DEVICE AND STORAGE MEDIUM

(71) Applicant: Apollo Intelligent Driving Technology (Beijing) Co., Ltd., Beijing (CN)

(72) Inventors: Zhi Wang, Beijing (CN); Yong Pan, Beijing (CN); Qinghui Zhao, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 138 days.

(21) Appl. No.: 17/017,508

(22) Filed: Sep. 10, 2020

(65) Prior Publication Data
US 2021/0287019 A1    Sep. 16, 2021

(30) Foreign Application Priority Data
Mar. 11, 2020    (CN) .......................... 202010166864.6

(51) Int. Cl.
*G06T 7/50* (2017.01)
*G06V 20/58* (2022.01)
(Continued)

(52) U.S. Cl.
CPC .............. *G06V 20/58* (2022.01); *G01S 7/412* (2013.01); *G01S 13/867* (2013.01);
(Continued)

(58) Field of Classification Search
CPC ........ G06T 7/50; G06V 13/867; G06V 10/82; G06V 20/588
See application file for complete search history.

(56) References Cited

U.S. PATENT DOCUMENTS

| | | | |
|---|---|---|---|
| 2009/0067675 A1* | 3/2009 | Tan .................. | G06V 20/588 382/104 |
| 2011/0050482 A1* | 3/2011 | Nanami ............. | G01S 13/867 342/146 |

(Continued)

FOREIGN PATENT DOCUMENTS

| | | |
|---|---|---|
| CN | 108983219 A | 12/2018 |
| CN | 109583416 A | 4/2019 |

(Continued)

OTHER PUBLICATIONS

Korean Office Action for Korean Application No. 10-2020-0125093, dated Dec. 14, 2021, 5 pages.

*Primary Examiner* — Myron Wyche
(74) *Attorney, Agent, or Firm* — Seed IP Law Group LLP

(57) ABSTRACT

A method and apparatus for detecting an obstacle, an electronic device, and a storage medium. A specific implementation of the method includes: detecting, by a millimeter-wave radar, position points of candidate obstacles in front of a vehicle; detecting, by a camera, a left road boundary line and a right road boundary line of a road on which a vehicle is located; separating the position points of the candidate obstacles according to the left road boundary line and the right road boundary line of the road on which the vehicle is located, and extracting position points between the left road boundary line and the right road boundary line; projecting the position points between the left road boundary line and the right road boundary line onto an image; and detecting, based on projection points of the position points on the image, a target obstacle in front of the vehicle.

9 Claims, 4 Drawing Sheets

(51) Int. Cl.
   *G06T 7/70* (2017.01)
   *G01S 7/41* (2006.01)
   *G01S 13/86* (2006.01)
   *G01S 13/931* (2020.01)
   *G06V 10/25* (2022.01)
   *G06V 20/56* (2022.01)

(52) U.S. Cl.
   CPC .............. *G01S 13/931* (2013.01); *G06T 7/50* (2017.01); *G06T 7/70* (2017.01); *G06V 10/25* (2022.01); *G06V 20/588* (2022.01); *G06T 2207/30256* (2013.01); *G06T 2207/30261* (2013.01)

(56) References Cited

U.S. PATENT DOCUMENTS

2018/0082137 A1    3/2018  Melvin et al.
2020/0210726 A1*   7/2020  Yang ..................... G06V 10/82

FOREIGN PATENT DOCUMENTS

| JP | 2010-061587 A | 3/2010 |
| JP | 2015-22698 A | 2/2015 |
| KR | 10-2015-0055345 A | 5/2015 |
| KR | 10-1976952 B1 | 5/2019 |

* cited by examiner

METHOD AND APPARATUS FOR DETECTING OBSTACLE, ELECTRONIC DEVICE AND STORAGE MEDIUM

CROSS-REFERENCE TO RELATED APPLICATIONS

This application claims priority to Chinese Patent Application No. 202010166864.6, filed with the China National Intellectual Property Administration (CNIPA) on Mar. 11, 2020, the contents of which are incorporated herein by reference in their entirety.

TECHNICAL FIELD

The present application relates to the technical field of intelligent vehicles, and further relates to an automatic driving technology, and more particularly to a method and apparatus for detecting obstacle, an electronic device, and a storage medium.

BACKGROUND

Environmental perception is the basis of intelligent driving technology. By installing sensing devices on to vehicle to sense the surrounding environment, intelligent auxiliary driving is realized. However, the vehicle sensing device has limited sensing range due to factors such as fixed position thereof or effective viewing angle thereof, and therefore, the acquired sensed information cannot meet the requirement of intelligent driving. In particular, in the case of automatic driving, the requirement for comprehensive environmental information is higher in order to ensure safe driving. In automatic driving schemes, radar sensors and visual sensors are two conventional sources of sensed information. Therefore, in the conventional environment sensing method, a radar ranging sensing module or a visual ranging sensing module is generally used to sense the environmental information around the vehicle.

In the radar ranging sensing module, a radio wave is transmitted by a millimeter-wave radar, and then a return wave is received, and position data of a target is measured based on the time difference between the transmitting and receiving. The millimeter-wave radar has ranging reliability and long-range sensing capability. However, the radar does not have discrimination power in the height direction, and a radar reflection point such as a viaduct or a billboard is falsely-detected as a front obstacle, which easily produces a cadence braking or the like. In the visual ranging sensing module, the on-line camera calibration technology is used, and change of the vehicle steering attitude is monitored in real time, the monocular ranging error caused by the change of the road condition is reduced. Camera calibration refers to that, in image measurement processes and machine vision applications, in order to determine the relationship between the three-dimensional geometric position of a point on the surface of a space object and its corresponding point in an image, a geometric model of camera imaging must be established, these geometric model parameters being camera parameters. In most conditions, these parameters can only be obtained through experiments and calculations; and the process of solving the parameters (internal parameters, external parameters, distortion parameters) is called camera calibration. However, for an obstacle that is not in the same plane as the vehicle, the precondition for the ground point monocular projection ranging is not satisfied, and therefore, the ranging result is also inaccurate. However, the on-line camera calibration technique can only correct the error caused by vehicle jitter, and cannot change the situation that the obstacle and the vehicle are not in the same plane.

SUMMARY

Embodiments of the present disclosure provide a method and apparatus for detecting an obstacle, an electronic device and a storage medium, which may detect an obstacle in front of the vehicle more accurately, and solves the problems of that the positioning of the obstacle in the height direction is inaccurate while the monocular camera cannot achieve an accurate ranging when the obstacle and the vehicle are not in the same plane.

In a first aspect, some embodiments of the present disclosure provide a method for detecting an obstacle, the method includes:

detecting, by a millimeter-wave radar, position points of candidate obstacles in front of a vehicle;

detecting, by a camera, a left road boundary line and a right road boundary line of a road on which a vehicle is located;

separating the position points of the candidate obstacles according to the left road boundary line and the right road boundary line of the road on which the vehicle is located, and extracting position points between the left road boundary line and the right road boundary line;

projecting the position points between the left road boundary line and the right road boundary line onto an image; and detecting, based on projection points of the position points on the image, a target obstacle in front of the vehicle.

The above embodiments have following advantages or beneficial effect: in embodiments of the present disclosure, the position points of the candidate obstacles can be separated by the left and right road boundary lines, and the position points between the left and right road boundary lines can be extracted; the position points between the left and right road boundary lines are projected onto an image; and a target obstacle in front of the vehicle is detected through the projection points of the position points on the image, thereby achieving the purpose of detecting an obstacle in front of the vehicle more accurately. In the conventional obstacle detection method, a millimeter-wave radar or a monocular camera is usually used separately to detect an obstacle, and the millimeter-wave radar has a problem of that the positioning of the obstacle in the height direction is inaccurate, while the monocular camera has the problem of that an accurate ranging cannot be achieved when the obstacle and the vehicle are not in the same plane. The solution of the present disclosure adopts the technical means of merging the millimeter-wave radar and the camera, the problems in the prior art that the positioning of the obstacle in the height direction is inaccurate while the monocular camera cannot achieve an accurate ranging when the obstacle and the vehicle are not in the same plane are overcome, and further, the technical effect of more accurately detecting an obstacle in front of the vehicle is achieved; Moreover, the technical solution of embodiments of the present disclosure is simple and convenient to implement, convenient to popularize, and wider in application range.

In the above embodiments, the detecting, based on the projection points of the position points on the image, the target obstacle in front of the vehicle, includes:

acquiring, on the image, regions of interest (ROIs) corresponding to the projection points;

calculating detection results of the ROIs corresponding to the projection points through a depth convolution network, wherein a detection result comprises: a detection result indicting existence of an obstacle or a detection result indicting non-existence of an obstacle; and detecting the target obstacle in front of the vehicle according to the detection results of the ROIs corresponding to the projection points.

The above embodiment have following advantages or beneficial effect: the above embodiment may calculate the detection results of the ROIs corresponding to the projection points through a depth convolution network, thus may accurately detects a target obstacle in front of the vehicle based on the detection results of the ROIs corresponding to the projection points.

In the above embodiments, the calculating the detection results of the ROIs corresponding to the projection points through the depth convolution network, includes:

inputting ROIs corresponding to the projection points into the depth convolution network;

acquiring, in the ROIs corresponding to the projection points, perception results of the position points;

calculating the detection results of the ROIs corresponding to the projection points based on the perception results of the position points; and outputting, by the depth convolution network, the detection results of the ROIs corresponding to the projection points.

The above embodiment have following advantages or beneficial effect: the above embodiment may calculate the detection results of the ROIs corresponding to the projection points based on the perception results of the position points. The perception result of each position point in each ROI may be a measurement value measured by the millimeter-wave radar for the each position point, and the measurement value may indicate whether an obstacle exists at the position point. Thus the electronic device may accurately determine the detection result of each ROI based on the measurement values of the position points in the each ROI.

In the above embodiment, after the calculating the detection results of the ROIs corresponding to the projection points through the depth convolution network, and before the detecting the target obstacle in front of the vehicle according to the detection results of the ROIs corresponding to the projection points, the method further includes:

extracting from the image, based on pre-determined position points falsely-detected by the radar, projection points of the falsely-detected position points on the image;

filtering out, in the detection results of the ROIs corresponding to the projection points outputted by the depth convolution network, the projection points of the falsely-detected position points and detection results of ROIs corresponding to the projection points of the falsely-detected position points; and determining the obstacle in front of the vehicle based on detection results of ROIs corresponding to projection points after the filtration.

The above embodiment of the present disclose has following advantages or beneficial effect: the above embodiment may filter out the projection points of the falsely-detected position points and detection results of ROIs corresponding to the projection points of the falsely-detected position points, and then determine the obstacle in front of the vehicle based on detection results of ROIs corresponding to projection points after the filtration, so that it may determine the obstacle in front of the vehicle more accurately.

In the above embodiment, the detecting, based on the projection points of the position points on the image, the target obstacle in front of the vehicle, includes: detecting a type of the target obstacle according to projection points of the position points on the image; and calculating a distance between the target obstacle and the vehicle based on the projection points of the position points on the image and a predetermined position point occupied by the vehicle.

The above embodiment has following advantages and beneficial effect: based on the projection points of the position points on the image and predetermined position points occupied by the vehicle, the above embodiment may accurately detect the type of the target obstacle, and accurately calculate a distance between the target obstacle and the vehicle.

In a second aspect, some embodiments of the present disclosure provide an apparatus for detecting an obstacle, the apparatus includes: a radar detection module, a camera detection module, an extraction module, and a fusion detection module.

the radar detection module is configured to detect, by a millimeter-wave radar, position points of candidate obstacles in front of a vehicle;

the camera detection module is configured to detect, by a camera, a left road boundary line and a right road boundary line of a road on which a vehicle is located;

the extraction module is configured to separate the position points of the candidate obstacles according to the left road boundary line and the right road boundary line of the road on which the vehicle is located, and extract position points between the left road boundary line and the right road boundary line;

the fusion detection module is configured to project the position points between the left road boundary line and the right road boundary line onto an image, and detect, based on projection points of the position points on the image, a target obstacle in front of the vehicle.

In the above embodiment, the fusion detection module comprises an acquisition sub-module, a calculation sub-module and a detection sub-module.

the acquisition sub-module is configured to acquire, on the image, regions of interest (ROIs) corresponding to the projection points;

the calculation sub-module is configured to calculate detection results of the ROIs corresponding to the projection points through a depth convolution network, wherein a detection result comprises: a detection result indicting existence of an obstacle or a detection result indicting non-existence of an obstacle; and the detection sub-module is configured to detect the target obstacle in front of the vehicle according to the detection results of the ROIs corresponding to the projection points.

In the above embodiment, the calculation sub-module is further configured to input ROIs corresponding to the projection points into the depth convolution network; acquire, in the ROIs corresponding to the projection points, perception results of the position points; calculate the detection results of the ROIs corresponding to the projection points based on the perception results of the position points; and output, by the depth convolution network, the detection results of the ROIs corresponding to the projection points.

In the above embodiment, the fusion detection module further comprises: a filtration sub-module for extracting from the image, based on pre-determined position points falsely-detected by the radar, projection points of the falsely-detected position points on the image, and filtering out, in the detection results of the ROIs corresponding to the projection points outputted by the depth convolution network, the projection points of the falsely-detected position points and detection results of ROIs corresponding to the projection points of the falsely-detected position points; and the detection sub-module is configured to determine the obstacle in front of the vehicle based on detection results of ROIs corresponding to projection points after the filtration.

In the above embodiment, the fusion detection module is further configured to detect a type of the target obstacle according to projection points of the position points on the image, and calculate a distance between the target obstacle and the vehicle based on the projection points of the position points on the image and predetermined position points occupied by the vehicle.

In a third aspect, some embodiments of the present disclosure provide an electronic device, includes:

one or more processors; and a memory for storing one or more programs, when the one or programs are executed by the one or more processors, cause the one or more processor to perform the method for detecting an obstacle according to any one of the embodiments of the present disclosure.

In a fourth aspect, some embodiments of the present disclosure provide a storage medium storing a computer program, when the computer program is executed by a processor, causes the method for detecting an obstacle according to any one of the embodiments of the present disclosure to be implemented.

An embodiment of the present disclosure has following advantages and technical effects: the method and apparatus for detecting an obstacle, the electronic device and storage medium, first detects, by a millimeter-wave radar, position points of candidate obstacles in front of a vehicle; then detects, by a camera, a left road boundary line and a right road boundary line of a road on which a vehicle is located; and separates the position points of the candidate obstacles according to the left road boundary line and the right road boundary line of the road on which the vehicle is located, and extracts position points between the left road boundary line and the right road boundary line; and finally projects the position points between the left road boundary line and the right road boundary line onto an image, and detects, based on projection points of the position points on the image, a target obstacle in front of the vehicle. That is, in embodiments of the present disclosure, the position points of the candidate obstacles can be separated by the left and right road boundary lines, and the position points between the left and right road boundary lines can be extracted; the position points between the left and right road boundary lines are projected onto an image; and a target obstacle in front of the vehicle is detected through the projection points of the position points on the image, thereby achieving the purpose of detecting an obstacle in front of the vehicle more accurately. In the conventional obstacle detection method, a millimeter-wave radar or a monocular camera is usually used separately to detect an obstacle, and the millimeter-wave radar has a problem of that the positioning of the obstacle in the height direction is inaccurate, while the monocular camera has the problem of that an accurate ranging cannot be achieved when the obstacle and the vehicle are not in the same plane. The solution of the present disclosure adopts the technical means of merging the millimeter-wave radar and the camera, the problems in the prior art that the positioning of the obstacle in the height direction is inaccurate while the monocular camera cannot achieve an accurate ranging when the obstacle and the vehicle are not in the same plane are overcome, and further, the technical effect of more accurately detecting an obstacle in front of the vehicle is achieved; Moreover, the technical solution of embodiments of the present disclosure is simple and convenient to implement, convenient to popularize, and wider in application range.

The other effects of the above optional implementations will be described below in conjunction with specific embodiments.

BRIEF DESCRIPTION OF THE DRAWINGS

The drawings are for providing a better understanding of the present disclosure and are not to be construed as limiting the scope of the present disclosure.

DETAILED DESCRIPTION OF EMBODIMENTS

Exemplary embodiments of the present disclosure are described below with reference to the accompanying drawings, in which various details of the embodiments of the present disclosure are included to facilitate understanding, and are to be considered as exemplary only. Accordingly, one of ordinary skill in the art should recognize that various changes and modifications may be made to the embodiments described herein without departing from the scope and spirit of the present disclosure. Also, for clarity and conciseness, descriptions of well-known functions and structures are omitted from the following description.

Embodiment 1

Figure 1:
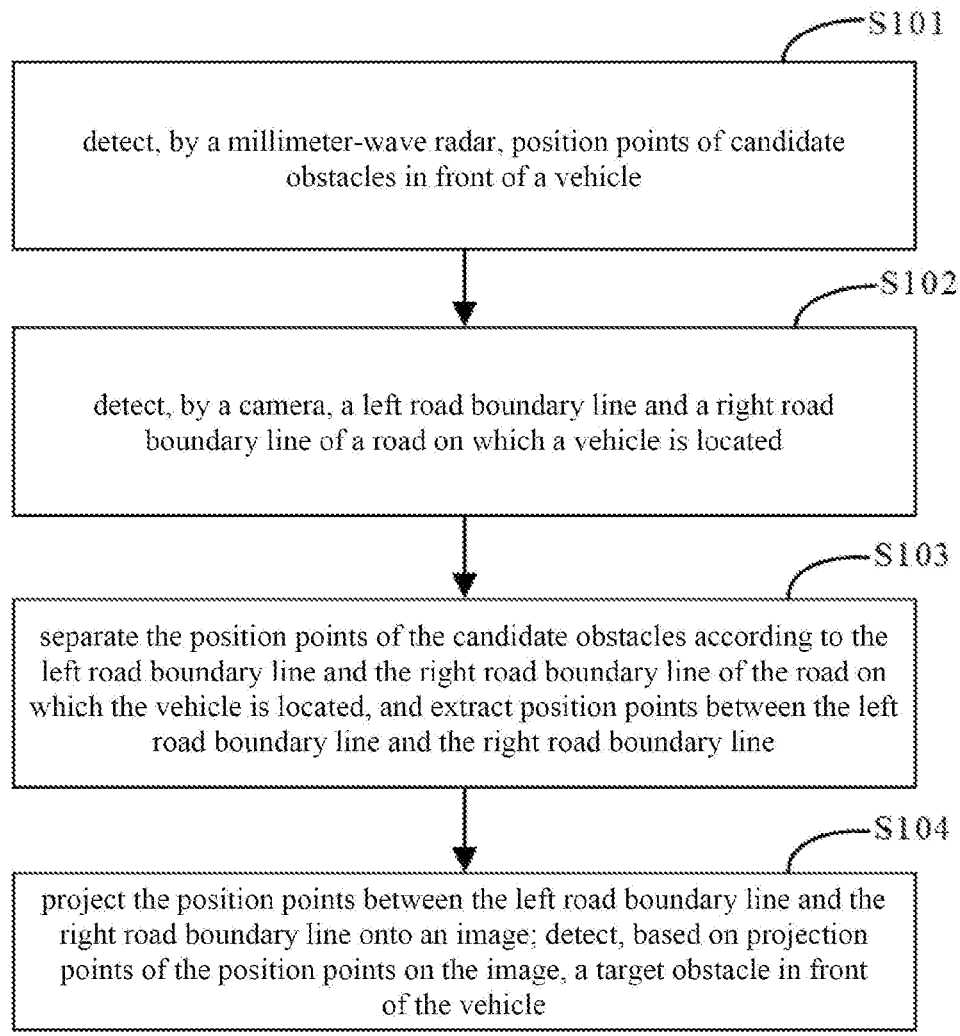
FIG. 1 is a schematic flow diagram of a method for detecting an obstacle according to Embodiment 1 of the present disclosure.

FIG. 1 is a schematic flow diagram of a method for detecting an obstacle according to Embodiment 1 of the present disclosure, which may be performed by an apparatus for detecting an obstacle or by an electronic device, the apparatus and the electronic device may be implemented in software and/or hardware, and the apparatus and the electronic device may be integrated in any intelligent device having a network communication function. As shown in FIG. 1, the method for detecting an obstacle may include the following steps:

S101, detect, by a millimeter-wave radar, position points of candidate obstacles in front of a vehicle.

In a specific embodiment of the present disclosure, the electronic device may detect, by the millimeter-wave radar, position points of the candidate obstacles in front of the vehicle. Specifically, during driving of the vehicle, the electronic device may transmit a radio wave through the millimeter-wave radar, then receive the return wave, and measure a coordinate of a position point of the candidate obstacles according to the time difference between the transmitting and receiving, and the coordinates of these position points may be two-dimensional coordinates.

S102, detect, by a camera, a left road boundary line and a right road boundary line of a road on which a vehicle is located.

In a specific embodiment of the present disclosure, the electronic device may detect, by a camera, the left and right road boundary lines of a road on which the vehicle is located. Specifically, during the driving of the vehicle, the electronic device may photograph, by the camera, the objects in front of the vehicle at fixed time intervals, and then detect, in the photographed images, the left and right road boundary lines of the road on which the vehicle is located. Specifically, if the left road boundary line cannot be detected in an image, the leftmost road edge of the road on which the vehicle is located is taken as the left road boundary line of the road; if the right road boundary line cannot be detected in an image, the rightmost road edge of the road on which the vehicle is located is taken as the right road boundary line of the road.

S103, separate the position points of the candidate obstacles according to the left road boundary line and the right road boundary line of the road on which the vehicle is located, and extract position points between the left road boundary line and the right road boundary line.

In a specific embodiment of the present disclosure, the electronic device can separate the position points of the candidate obstacles based on the left and right road boundary lines of the road on which the vehicle is located, and extract the position points between the left and right road boundary lines. Specifically, in the position points of the candidate obstacles detected by the radar, following operations are performed for each of the position points: if the coordinate of the position point is between the left road boundary line and the right road boundary line, or the coordinate of the position point is on the left road boundary line, or the coordinate of the position point is on the right road boundary line, then the position point is kept; if the coordinate of the position point is outside the left road boundary line, or the coordinate of the position point is outside the right road boundary line, the coordinate of the position point are deleted. By the above-described operations for each of the position points, it can separate the position points of the candidate obstacles and extract the position points between the left and right road boundary lines.

S104, project the position points between the left road boundary line and the right road boundary line onto an image; detect, based on projection points of the position points on the image, a target obstacle in front of the vehicle.

In a specific embodiment of the present disclosure, the electronic device may project the respective location points between the left and right road boundary lines onto the image; and may detect a target obstacle in front of the vehicle based on the projection points of the position points on the image. Specifically, the electronic device may mark the ground points of the respective position points between the left and the right road boundary lines on the image, and detect the target obstacle in front of the vehicle based on the ground points of the respective position points on the image. Specifically, the electronic device may: acquire, on the image, regions of interest (ROIs) corresponding to the projection points; calculate detection results of the ROIs corresponding to the projection points through a depth convolution network, where the detection result includes a detection result indicating an existence of an obstacle or a detection result indicating non-existence of an obstacle; and then detect a target obstacle in front of the vehicle according to the detection results of the ROIs corresponding to the projection points.

The method for detecting an obstacle according to embodiments of the present disclosure, first detects, by a millimeter-wave radar, position points of candidate obstacles in front of a vehicle; then detects, by a camera, a left road boundary line and a right road boundary line of a road on which a vehicle is located; and separates the position points of the candidate obstacles according to the left road boundary line and the right road boundary line of the road on which the vehicle is located, and extracts position points between the left road boundary line and the right road boundary line; and finally projects the position points between the left road boundary line and the right road boundary line onto an image, and detects, based on projection points of the position points on the image, a target obstacle in front of the vehicle. That is, in embodiments of the present disclosure, the position points of the candidate obstacles can be separated by the left and right road boundary lines, and the position points between the left and right road boundary lines can be extracted; the position points between the left and right road boundary lines are projected onto an image; and a target obstacle in front of the vehicle is detected through the projection points of the position points on the image, thereby achieving the purpose of detecting an obstacle in front of the vehicle more accurately.

In the conventional obstacle detection method, a millimeter-wave radar or a monocular camera is usually used separately to detect an obstacle, and the millimeter-wave radar has a problem of that the positioning of the obstacle in the height direction is inaccurate, while the monocular camera has the problem of that an accurate ranging cannot be achieved when the obstacle and the vehicle are not in the same plane. The solution of the present disclosure adopts the technical means of merging the millimeter-wave radar and the camera, the problems in the prior art that the positioning of the obstacle in the height direction is inaccurate while the monocular camera cannot achieve an accurate ranging when the obstacle and the vehicle are not in the same plane are overcome, and further, the technical effect of more accurately detecting an obstacle in front of the vehicle is achieved; Moreover, the technical solution of embodiments of the present disclosure is simple and convenient to implement, convenient to popularize, and wider in application range.

Embodiment 2

Figure 2:
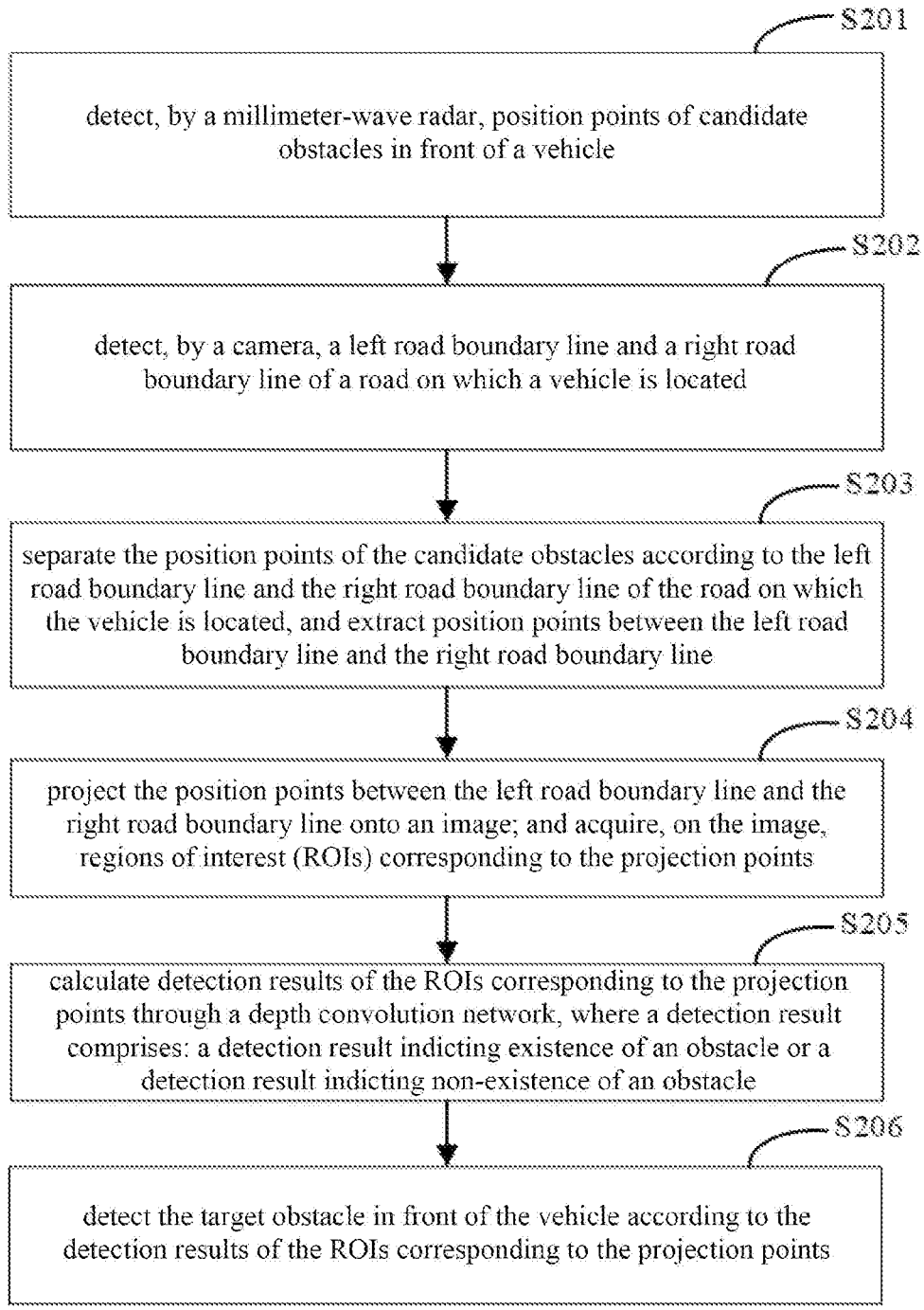
FIG. 2 is a schematic flow diagram of a method for detecting an obstacle according to Embodiment 2 of the present disclosure.

FIG. 2 is a schematic flowchart of a method for detecting an obstacle according to Embodiment 2 of the present disclosure. As shown in FIG. 2, the method for detecting an obstacle may include the following steps:

S201, detect, by a millimeter-wave radar, position points of candidate obstacles in front of a vehicle.

In a specific embodiment of the present disclosure, the electronic device may detect, by the millimeter-wave radar, position points of the candidate obstacles in front of the vehicle. Specifically, during driving of the vehicle, the electronic device may transmit radio waves through the millimeter-wave radar, then receive return waves, and measure coordinates of the position points of the candidate obstacles according to the time difference between the transmitting and receiving, and the coordinates of these position points may be two-dimensional coordinates.

S202, detect, by a camera, a left road boundary line and a right road boundary line of a road on which a vehicle is located.

In a specific embodiment of the present disclosure, the electronic device may detect, by a camera, the left and right road boundary lines of a road on which the vehicle is located. Specifically, during the driving of the vehicle, the electronic device may photograph, by the camera, the objects in front of the vehicle at fixed time intervals, and then detect, in the photographed images, the left and right road boundary lines of the road on which the vehicle is located. Specifically, if the left road boundary line cannot be detected in an image, the leftmost road edge of the road on which the vehicle is located is taken as the left road boundary line of the road; if the right road boundary line cannot be detected in an image, the rightmost road edge of the road on which the vehicle is located is taken as the right road boundary line of the road.

S203, separate the position points of the candidate obstacles according to the left road boundary line and the right road boundary line of the road on which the vehicle is located, and extract position points between the left road boundary line and the right road boundary line.

In a specific embodiment of the present disclosure, the electronic device can separate the position points of the candidate obstacles based on the left and right road boundary lines of the road on which the vehicle is located, and extract the position points between the left and right road boundary lines. Specifically, in the position points of the candidate obstacles detected by the radar, following operations are performed for each of the position points: if the coordinate of the position point is between the left road boundary line and the right road boundary line, or the coordinate of the position point is on the left road boundary line, or the coordinate of the position point is on the right road boundary line, then the position point is kept; if the coordinate of the position point is outside the left road boundary line, or the coordinate of the position point is outside the right road boundary line, the coordinate of the position point are deleted. By the above-described operations for each of the position points, it can separate the position points of the candidate obstacles and extract the position points between the left and right road boundary lines.

S204, project the position points between the left road boundary line and the right road boundary line onto an image; and acquire, on the image, regions of interest (ROIs) corresponding to the projection points.

In a specific embodiment of the present disclosure, the electronic device may project respective position points between the left and right road boundary lines onto the image; and may acquire ROIs corresponding to the projection points on the image. Specifically, the ROIs of the projection points may be regions of regular shapes centered on the position points, for example, an ROI may be a circular region, a rectangular region, or the like.

S205, calculate detection results of the ROIs corresponding to the projection points through a depth convolution network, where a detection result comprises: a detection result indicting existence of an obstacle or a detection result indicting non-existence of an obstacle.

In a specific embodiment of the present disclosure, the electronic device may calculate the detection results of the ROIs corresponding to the projection points through the depth convolution network, where a detection result comprises: a detection result indicting existence of an obstacle or a detection result indicting non-existence of an obstacle.

Specifically, the electronic device may input an ROI corresponding to the projection points into the depth convolution network; then may acquire perception results of the position points in the ROI corresponding to the projection points; then calculate the detection result of the ROI corresponding to the projection points based on the perception results of the position points; and then output, by the depth convolution network, the detection result of the ROI corresponding to the projection points. Specifically, the perception result of each position point in each ROI may be a measurement value measured by the millimeter-wave radar for the each position point, and the measurement value may indicate whether an obstacle exists at the position point. In this step, the electronic device may determine the detection result of each ROI based on the measurement values of the position points in the each ROI. For example, assuming that an ROI region includes 50 position points, in which 30 position points therein have measurement values indicating an existence of an obstacle, and 20 position points therein have measurement values indicating non-existence of an obstacle, then the electronic device may determine that the detection result of the ROI is that an obstacle exists.

S206, detect the target obstacle in front of the vehicle according to the detection results of the ROIs corresponding to the projection points.

In a specific embodiment of the present disclosure, the electronic device can detect the target obstacle in front of the vehicle based on the detection results of the ROIs corresponding to the projection points. Specifically, the electronic device may mark the detection results of the ROIs on the image. For example, if the detection result of an ROI indicates an existence of an obstacle, the electronic device may mark, on the image, the ROI as 1. If the detection result of an ROI indicates non-existence of an obstacle, the electronic device may mark, on the image, the ROI as 0. In this way, the target obstacle in front of the vehicle can be detected based on the detection result of each ROI.

Preferably, in a specific embodiment of the present disclosure, after the electronic device calculates the detection results of the ROIs corresponding to the projection points through the depth convolution network, and before the target obstacle in front of the vehicle is detected according to the detection results of the ROIs corresponding to the projection points, the electronic device may further extract, from the image, projection points of falsely-detected position points on the image based on the predetermined position points falsely-detected by the radar; then may filter out, in the detection results of the ROIs corresponding to the projection points outputted by the depth convolution network, the projection points of the falsely-detected position points and detection result of ROI corresponding to the projection points of the falsely-detected position points.

Preferably, in a specific embodiment of the present disclosure, the electronic device can detect the type of the target obstacle according to the projection points of the respective position points on the image; and may calculate the distance between the target obstacle and the vehicle based on the projection points of position points on the image and the predetermined position points occupied by the vehicle.

The method for detecting an obstacle according to embodiments of the present disclosure, first detects, by a millimeter-wave radar, position points of candidate obstacles in front of a vehicle; then detects, by a camera, a left road boundary line and a right road boundary line of a road on which a vehicle is located; and separates the position points of the candidate obstacles according to the left road boundary line and the right road boundary line of the road on which the vehicle is located, and extracts position points between the left road boundary line and the right road boundary line; and finally projects the position points between the left road boundary line and the right road boundary line onto an image, and detects, based on projection points of the position points on the image, a target obstacle in front of the vehicle. That is, in embodiments of the present disclosure, the position points of the candidate obstacles can be separated by the left and right road boundary lines, and the position points between the left and right road boundary lines can be extracted; the position points between the left and right road boundary lines are projected onto an image; and a target obstacle in front of the vehicle is detected through the projection points of the position points on the image, thereby achieving the purpose of detecting an obstacle in front of the vehicle more accurately. In the conventional obstacle detection method, a millimeter-wave radar or a monocular camera is usually used separately to detect an obstacle, and the millimeter-wave radar has a problem of that the positioning of the obstacle in the height direction is inaccurate, while the monocular camera has the problem of that an accurate ranging cannot be achieved when the obstacle and the vehicle are not in the same plane. The solution of the present disclosure adopts the technical means of merging the millimeter-wave radar and the camera, the problems in the prior art that the positioning of the obstacle in the height direction is inaccurate while the monocular camera cannot achieve an accurate ranging when the obstacle and the vehicle are not in the same plane are overcome, and further, the technical effect of more accurately detecting an obstacle in front of the vehicle is achieved; Moreover, the technical solution of embodiments of the present disclosure is simple and convenient to implement, convenient to popularize, and wider in application range.

Embodiment 3

Figure 3:
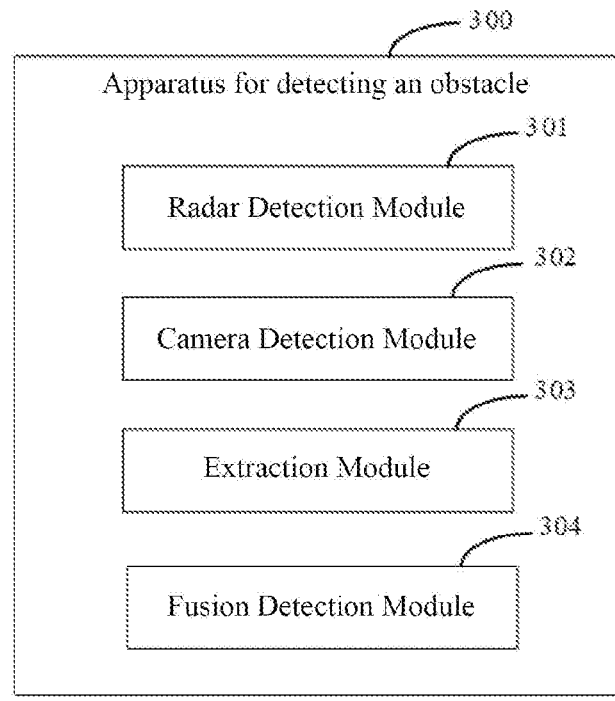
FIG. 3 is a schematic structural diagram of an apparatus for detecting an obstacle according to Embodiment 3 of the present disclosure.

FIG. 3 is a schematic structural diagram of an apparatus for detecting an obstacle according to Embodiment 3 of the present disclosure. As shown in FIG. 3, the apparatus 300 includes a radar detection module 301, a camera detection module 302, an extraction module 303, and a fusion detection module 304.

The radar detection module 301 is configured to detect, by a millimeter-wave radar, position points of candidate obstacles in front of a vehicle;

The camera detection module 302 is configured to detect, by a camera, a left road boundary line and a right road boundary line of a road on which a vehicle is located;

The extraction module 303 is configured to separate the position points of the candidate obstacles according to the left road boundary line and the right road boundary line of the road on which the vehicle is located, and extract position points between the left road boundary line and the right road boundary line;

The fusion detection module 304 is configured to project the position points between the left road boundary line and the right road boundary line onto an image, and detect, based on projection points of the position points on the image, a target obstacle in front of the vehicle.

Figure 4:
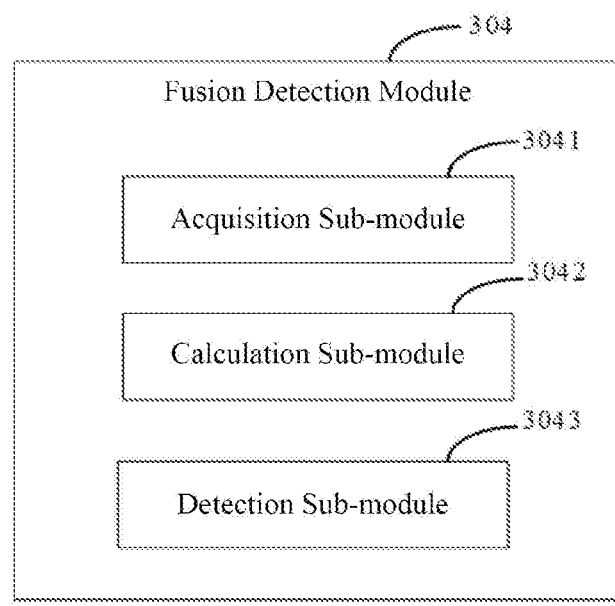
FIG. 4 is a schematic structural diagram of a fusion detection module according to Embodiment 3 of the present disclosure.

FIG. 4 is a schematic structural diagram of the fusion detection module 304 provided in Embodiment 3 of the present disclosure. As shown in FIG. 4, the fusion detection module 304 includes an acquisition sub-module 3041, a calculation sub-module 3042, and a detection sub-module 3043.

The acquisition sub-module 3041 is configured to acquire, on the image, regions of interest (ROIs) corresponding to the projection points;

The calculation sub-module 3042 is configured to calculate detection results of the ROIs corresponding to the projection points through a depth convolution network, where a detection result includes: a detection result indicting existence of an obstacle or a detection result indicting non-existence of an obstacle;

The detection sub-module 3043 is configured to detect the target obstacle in front of the vehicle according to the detection results of the ROIs corresponding to the projection points.

Further, the calculation sub-module 3042 is further configured to input ROIs corresponding to the projection points into the depth convolution network; acquire, in the ROIs corresponding to the projection points, perception results of the position points; calculate the detection results of the ROIs corresponding to the projection points based on the perception results of the position points; and output, by the depth convolution network, the detection results of the ROIs corresponding to the projection points.

Further, the fusion detection module further includes a filtration sub-module 3044 (not shown in the figures) for extracting from the image, based on pre-determined position points falsely-detected by the radar, projection points of the falsely-detected position points on the image, and filtering out, in the detection results of the ROIs corresponding to the projection points outputted by the depth convolution network, the projection points of the falsely-detected position points and detection results of ROIs corresponding to the projection points of the falsely-detected position points;

The detection sub-module 3043 is configured to determine the obstacle in front of the vehicle based on detection results of ROIs corresponding to projection points after the filtration.

Further, the fusion detection module 304 is specifically configured to detect a type of the target obstacle according to projection points of the position points on the image, and calculate a distance between the target obstacle and the vehicle based on the projection points of the position points on the image and predetermined position points occupied by the vehicle.

The apparatus for detecting an obstacle can perform the method provided in any one of the embodiments of the present disclosure, and has function modules and beneficial effects corresponding to the execution method. The technical details not described in detail in the present embodiment may be referred to the method for detecting an obstacle provided in any embodiment of the present disclosure.

Embodiment 4

An embodiment of the present disclosure also provides an electronic device and a computer-readable storage medium.

Figure 5:
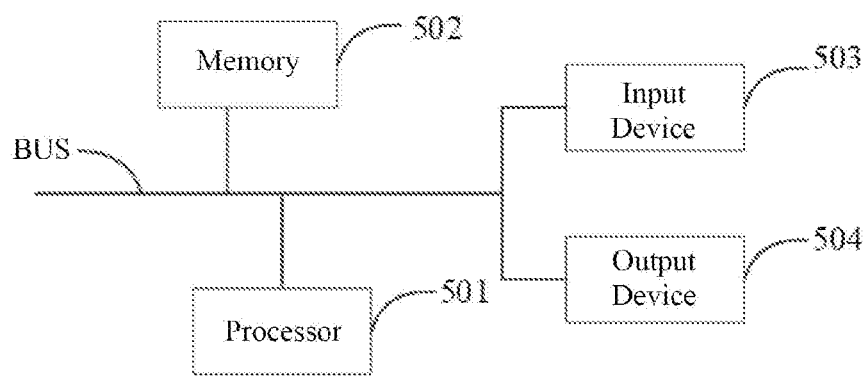
FIG. 5 is a block diagram of an electronic device for implementing the method for detecting an obstacle of embodiments of the present disclosure.

FIG. 5 is a block diagram of an electronic device of the method for detecting an obstacle according to an embodiment of the present disclosure. The electronic device is intended to represent various forms of digital computers, such as laptop computers, desktop computers, worktables, personal digital assistants, servers, blade servers, large-scale computers, and other suitable computers. The electronic device may also represent various forms of mobile devices, such as personal digital assistants, cellular telephones, smart phones, wearable devices, and other similar computing devices. The components shown herein, their connections and relationships, and their functions are by way of example only and are not intended to limit the implementations of the present disclosure as described and/or claimed herein.

As shown in FIG. 5, the electronic device includes one or more processors 501, a memory 502, and an interface for connecting components, including a high-speed interface and a low-speed interface. The various components are connected to each other by different buses, and may be mounted on a common motherboard or installed in other ways as desired. The processor may process instructions executed within the electronic device, including instructions stored in or on a memory to display graphical information of the GUI on an external input/output device, such as a display device coupled to the interface. In other embodiments, multiple processors and/or multiple buses may be used with multiple memories, if desired. Similarly, a plurality of electronic devices may be connected, each providing a portion of necessary operations (e.g., as a server array, a set of blade servers, or a multiprocessor system). one processor 501 is taken as an example in FIG. 5.

The memory 502 is a non-transitory computer readable storage medium provided herein. The memory stores instructions executable by at least one processor, to cause the at least one processor to perform the method for detecting an obstacle provided herein. The non-transitory computer-readable storage medium of the present disclosure stores computer instructions for causing a computer to perform the method for detecting an obstacle provided herein.

As a non-transitory computer readable storage medium, the memory 502 may be used to store non-transitory software programs, non-transitory computer executable programs, and modules, for example, the program instructions/modules corresponding to the method for detecting an obstacle in embodiments of the present disclosure (for example, the radar detection module 301, the camera detection module 302, the extraction module 303, and the fusion detection module 304 shown in FIG. 3). The processor 501 runs the software programs, instructions and modules stored in the memory 502 to execute various functional applications and data processing of a server, that is, to implement the method for detecting an obstacle of the above method embodiments.

The memory 502 may include a program storage area and a data storage area. The program storage area may store an operating system and an application required for at least one function. The data storage area may store data and the like created according to the usage of an electronic device according to the method for detecting an obstacle. In addition, the memory 502 may include a high-speed random access memory, and may also include a non-transitory memory, e.g., at least one disk storage device, a flash memory device or other non-volatile solid-state storage devices. In some embodiments, the memory 502 may further include memories remotely arranged relative to the processor 501, where the remote memories may be connected to the electronic device of the method for detecting an obstacle by a network. An example of the above network includes but not limited to, the Internet, an enterprise intranet, a local area network, a mobile communications network, and a combination thereof.

The electronic device of the method for detecting an obstacle may further include an input device 503 and an output device 504. The processor 501, the memory 502, the input device 503, and the output device 504 may be connected via a bus or in other modes. Connection by a bus is used as an example in FIG. 5.

The input device 503 may be used for receiving entered digit or character information, and generating a key signal input related to the user setting and function control of the electronic device of the method for detecting an obstacle, such as a touch screen, a keypad, a mouse, a track pad, a touch pad, a pointer bar, one or more mouse buttons, a trackball, a joystick, or the like. The output device 504 may include a display device, an auxiliary illumination device (e.g., an LED), a tactile feedback device (e.g., a vibration motor), and the like. The display device may include, but is not limited to, a liquid crystal display (LCD), a light emitting diode (LED) display, and a plasma display. In some embodiments, the display device may be a touch screen.

The various embodiments of the systems and techniques described herein may be implemented in digital electronic circuit systems, integrated circuit systems, application specific ASICs (application specific integrated circuits), computer hardware, firmware, software, and/or combinations thereof. These various embodiments may include: being implemented in one or more computer programs that may be executed and/or interpreted on a programmable system including at least one programmable processor which may be a dedicated or general purpose programmable processor, it may receive data and instructions from a memory system, at least one input device, and at least one output device, and transmit the data and instructions to the memory system, the at least one input device, and the at least one output device.

These computing programs (also referred to as programs, software, software applications, or code) include machine instructions of a programmable processor and may be implemented in high-level procedures and/or object-oriented programming languages, and/or assembly/machine languages. As used herein, the terms "machine-readable medium" and "computer-readable medium" refer to any computer program product, device, and/or device (e.g., magnetic disk, optical disk, memory, programmable logic device (PLD)) for providing machine instructions and/or data to a programmable processor, including a machine-readable medium that receives machine instructions as machine-readable signals. The term "machine readable signal" refers to any signal used to provide machine instructions and/or data to a programmable processor.

To provide interaction with a user, the systems and techniques described herein may be implemented on a computer having a display device (e.g., a CRT (cathode ray tube) or LCD (liquid crystal display) monitor) for displaying information to the user and a keyboard and a pointing device (e.g., a mouse or a trackball) through which a user can provide input to the computer. Other types of devices may also be used to provide interaction with a user. For example, the feedback provided to the user may be any form of sensory feedback (e.g., visual feedback, auditory feedback, or tactile feedback). The input in any form, including acoustic input, speech input, or tactile input, may be received from the user.

The systems and techniques described herein may be implemented in a computing system including a backend component (e.g., as a data server), or a computing system including a middleware component (e.g., an application server), or a computing system including a front-end component (e.g., a personal computer having a graphical user interface or a web browser through which a user may interact with embodiments of the systems and techniques described herein), or a computing system including any combination of such backend component, middleware component, or front-end component. The components of the system may be interconnected by any form or medium of digital data communication (e.g., a communication network). Examples of communication networks include local region networks (LANs), wide region networks (WANs), the Internet, and block chain networks.

The computer system may include a client and a server. The client and server are typically remote from each other and typically interact through a communication network. The relationship between the client and the server is generated by a computer program running on the corresponding computer and having a client-server relationship with each other.

The technical solution of embodiments of the present disclosure, first detect, by a millimeter-wave radar, position points of candidate obstacles in front of a vehicle; then detects, by a camera, a left road boundary line and a right road boundary line of a road on which a vehicle is located; and separates the position points of the candidate obstacles according to the left road boundary line and the right road boundary line of the road on which the vehicle is located, and extracts position points between the left road boundary line and the right road boundary line; and finally projects the position points between the left road boundary line and the right road boundary line onto an image, and detects, based on projection points of the position points on the image, a target obstacle in front of the vehicle. That is, in embodiments of the present disclosure, the position points of the candidate obstacles can be separated by the left and right road boundary lines, and the position points between the left and right road boundary lines can be extracted; the position points between the left and right road boundary lines are projected onto an image; and a target obstacle in front of the vehicle is detected through the projection points of the position points on the image, thereby achieving the purpose of detecting an obstacle in front of the vehicle more accurately. In the conventional obstacle detection method, a millimeter-wave radar or a monocular camera is usually used separately to detect an obstacle, and the millimeter-wave radar has a problem of that the positioning of the obstacle in the height direction is inaccurate, while the monocular camera has the problem of that an accurate ranging cannot be achieved when the obstacle and the vehicle are not in the same plane. The solution of the present disclosure adopts the technical means of merging the millimeter-wave radar and the camera, the problems in the prior art that the positioning of the obstacle in the height direction is inaccurate while the monocular camera cannot achieve an accurate ranging when the obstacle and the vehicle are not in the same plane are overcome, and further, the technical effect of more accurately detecting an obstacle in front of the vehicle is achieved; Moreover, the technical solution of embodiments of the present disclosure is simple and convenient to implement, convenient to popularize, and wider in application range.

It should be understood that the various forms of processes may be used, and the steps may be reordered, added or deleted. For example, the steps described in the present disclosure may be performed in parallel or sequentially or in a different order, as long as the desired results of the technical solution disclosed in the present disclosure can be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and improvements made within the spirit and principles of the present disclosure are to be included within the scope of the present disclosure.

What is claimed is:

1. A method for detecting an obstacle, comprising:
   detecting, by a millimeter-wave radar, position points of candidate obstacles in front of a vehicle;
   detecting, by a camera, a left road boundary line and a right road boundary line of a road on which a vehicle is located;
   separating the position points of the candidate obstacles according to the left road boundary line and the right road boundary line of the road on which the vehicle is located, and extracting position points between the left road boundary line and the right road boundary line;
   projecting the position points between the left road boundary line and the right road boundary line onto an image;
   acquiring, on the image, regions of interest (ROIs) corresponding to the projection points;
   calculating detection results of the ROIs corresponding to the projection points through a depth convolution network, wherein a detection result comprises: a detection result indicting existence of an obstacle or a detection result indicting non-existence of an obstacle;
   extracting from the image, based on pre-determined position points falsely-detected by the radar, projection points of the falsely-detected position points on the image;
   filtering out, in the detection results of the ROIs corresponding to the projection points outputted by the depth convolution network, the projection points of the falsely-detected position points and detection results of ROIs corresponding to the projection points of the falsely-detected position points;
   determining the obstacle in front of the vehicle based on detection results of ROIs corresponding to projection points after the filtration; and
   detecting the target obstacle in front of the vehicle according to the detection results of the ROIs corresponding to the projection points.

2. The method according to claim 1, wherein the calculating the detection results of the ROIs corresponding to the projection points through the depth convolution network comprises:
   inputting ROIs corresponding to the projection points into the depth convolution network;
   acquiring, in the ROIs corresponding to the projection points, perception results of the position points;
   calculating the detection results of the ROIs corresponding to the projection points based on the perception results of the position points; and
   outputting, by the depth convolution network, the detection results of the ROIs corresponding to the projection points.

3. The method according to claim 1, wherein the detecting, based on the projection points of the position points on the image, the target obstacle in front of the vehicle comprises:
   detecting a type of the target obstacle according to projection points of the position points on the image; and
   calculating a distance between the target obstacle and the vehicle based on the projection points of the position points on the image and predetermined position points occupied by the vehicle.

4. An apparatus for detecting an obstacle, comprising:
   at least one processor; and
   a memory storing instructions, the instructions, when executed by the at least one processor, cause the at least one processor to perform operations, the operations comprising:

detecting, by a millimeter-wave radar, position points of candidate obstacles in front of a vehicle;

detecting, by a camera, a left road boundary line and a right road boundary line of a road on which a vehicle is located;

separating the position points of the candidate obstacles according to the left road boundary line and the right road boundary line of the road on which the vehicle is located, and extracting position points between the left road boundary line and the right road boundary line; and projecting the position points between the left road boundary line and the right road boundary line onto an image;

acquiring, on the image, regions of interest (ROIs) corresponding to the projection points;

calculating detection results of the ROIs corresponding to the projection points through a depth convolution network, wherein a detection result comprises: a detection result indicting existence of an obstacle or a detection result indicting non-existence of an obstacle;

extracting from the image, based on pre-determined position points falsely-detected by the radar, projection points of the falsely-detected position points on the image;

filtering out, in the detection results of the ROIs corresponding to the projection points outputted by the depth convolution network, the projection points of the falsely-detected position points and detection results of ROIs corresponding to the projection points of the falsely-detected position points;

determining the obstacle in front of the vehicle based on detection results of ROIs corresponding to projection points after the filtration; and detecting the target obstacle in front of the vehicle according to the detection results of the ROIs corresponding to the projection points.

5. The apparatus according to claim 4, wherein the calculating the detection results of the ROIs corresponding to the projection points through the depth convolution network comprises:

inputting ROIs corresponding to the projection points into the depth convolution network;

acquiring, in the ROIs corresponding to the projection points, perception results of the position points;

calculating the detection results of the ROIs corresponding to the projection points based on the perception results of the position points; and outputting, by the depth convolution network, the detection results of the ROIs corresponding to the projection points.

6. The apparatus according to claim 4, wherein the detecting, based on the projection points of the position points on the image, the target obstacle in front of the vehicle comprises:

detecting a type of the target obstacle according to projection points of the position points on the image; and calculating a distance between the target obstacle and the vehicle based on the projection points of the position points on the image and predetermined position points occupied by the vehicle.

7. A non-transitory computer-readable storage medium storing computer instructions, wherein the computer instructions, when executed by a processor, cause the processor to perform operations, the operations comprising:

detecting, by a millimeter-wave radar, position points of candidate obstacles in front of a vehicle;

detecting, by a camera, a left road boundary line and a right road boundary line of a road on which a vehicle is located;

separating the position points of the candidate obstacles according to the left road boundary line and the right road boundary line of the road on which the vehicle is located, and extracting position points between the left road boundary line and the right road boundary line;

projecting the position points between the left road boundary line and the right road boundary line onto an image;

acquiring, on the image, regions of interest (ROIs) corresponding to the projection points;

calculating detection results of the ROIs corresponding to the projection points through a depth convolution network, wherein a detection result comprises: a detection result indicting existence of an obstacle or a detection result indicting non-existence of an obstacle;

extracting from the image, based on pre-determined position points falsely-detected by the radar, projection points of the falsely-detected position points on the image;

filtering out, in the detection results of the ROIs corresponding to the projection points outputted by the depth convolution network, the projection points of the falsely-detected position points and detection results of ROIs corresponding to the projection points of the falsely-detected position points;

determining the obstacle in front of the vehicle based on detection results of ROIs corresponding to projection points after the filtration; and detecting the target obstacle in front of the vehicle according to the detection results of the ROIs corresponding to the projection points.

8. The medium according to claim 7, wherein the calculating the detection results of the ROIs corresponding to the projection points through the depth convolution network comprises:

inputting ROIs corresponding to the projection points into the depth convolution network;

acquiring, in the ROIs corresponding to the projection points, perception results of the position points;

calculating the detection results of the ROIs corresponding to the projection points based on the perception results of the position points; and outputting, by the depth convolution network, the detection results of the ROIs corresponding to the projection points.

9. The medium according to claim 7, wherein the detecting, based on the projection points of the position points on the image, the target obstacle in front of the vehicle comprises:

detecting a type of the target obstacle according to projection points of the position points on the image; and calculating a distance between the target obstacle and the vehicle based on the projection points of the position points on the image and predetermined position points occupied by the vehicle.

* * * * *